Feb. 5, 1952
A. S. VOLPIN
2,584,761
LUBRICATED GLOBE VALVE
Filed Aug. 24, 1945
2 SHEETS—SHEET 2
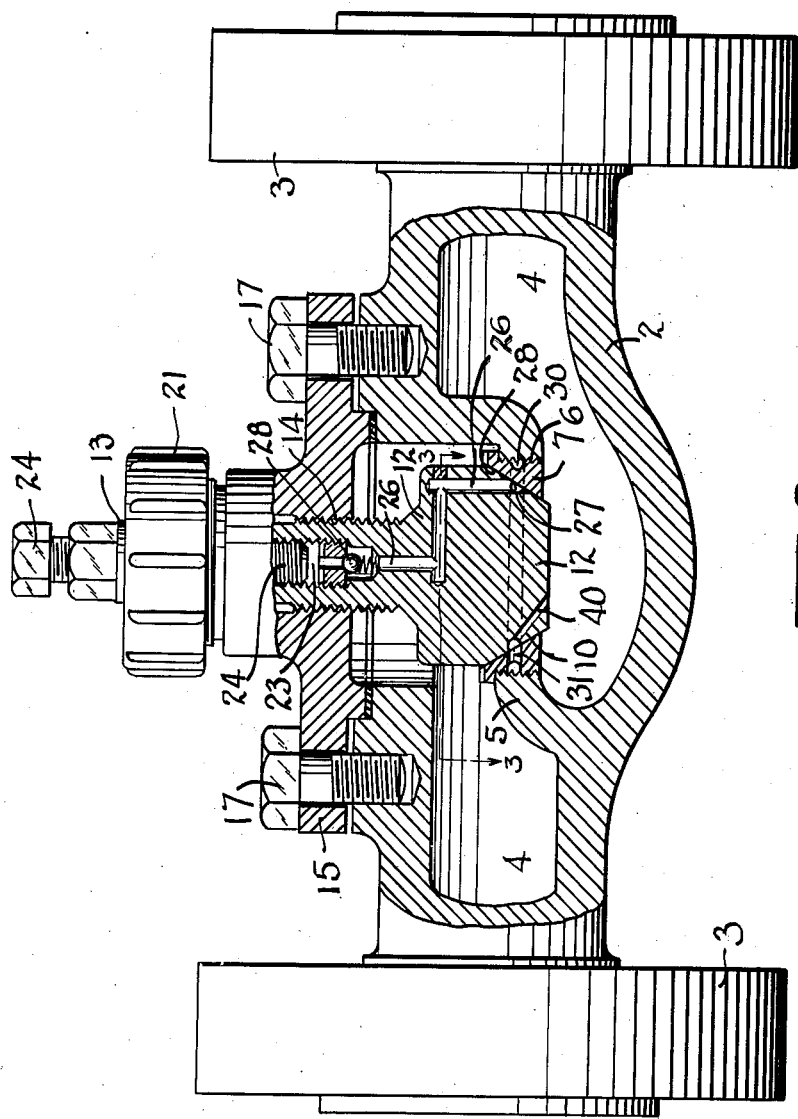
A.S. VOLPIN.
*INVENTOR.*
BY *Lester B. Clark*
*+ Ray L. Smith*
ATTORNEYS.

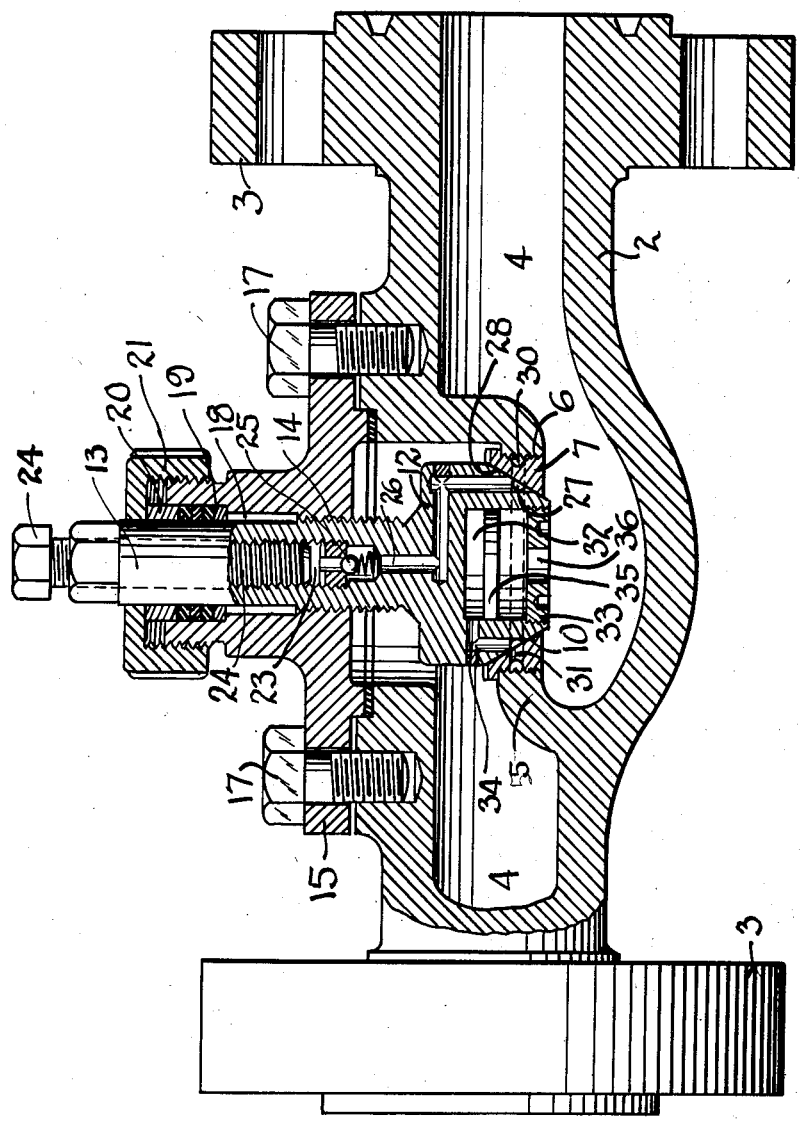

Patented Feb. 5, 1952

2,584,761

UNITED STATES PATENT OFFICE 2,584,761

LUBRICATED GLOBE VALVE

Alexander S. Volpin, Houston, Tex.

Application August 24, 1945, Serial No. 612,444

1 Claim. (Cl. 251—20)

The invention relates to a globe valve and particularly to an arrangement thereof whereby automatic lubrication or sealing material is supplied.

It is one of the objects of the invention to provide an arrangement of structure whereby a seal may be maintained at the sealing faces of the valve as well as between the seat ring and the valve housing by supplying a sealing material to both of such areas and maintaining such supply by the line pressure on the valve.

Another object is to provide a supply of sealing material for both valve seat and the ring seat.

Another object of the invention is to provide a globe valve where sealing material supplied through the valve member may pass to the area between the valve seat ring and the valve housing.

Still another object of the invention is to provide a reservoir for sealing material in a globe valve member and passages therefrom to each the valve and seat sealing faces and to the seat and housing connection.

Other and further objects of the invention will be readily apparent when the following description is considered in connection with the accompanying drawings wherein:

Fig. 1 is a vertical longitudinal section of a globe valve showing the structure for using the invention with the reservoir in the valve members;

Fig. 2 is a similar section of another form where the reservoir is omitted;

Fig. 3 is a section taken on the line 3—3 of Fig. 2, showing the valve member.

In the drawing the valve housing is made up of the body 2 provided with flanges 3 at each end. A flow passage 4 extends thru the body and is interrupted by the wall or partition 5 which extends longitudinally of the passage and has an opening 6 therethrough.

This opening 6 is preferably threaded so as to receive the complementarily threaded seat ring 7. The seat ring 7 is annular and has a passage therethrough which is defined by the tapered seating face 10.

A valve member 12 has a stem 13 threaded at 14 thru the bonnet or cap plate 15 affixed to the body by the bolts 17. The cap plate has a recess 18 containing packing 19 held in place by gland 20 and collar 21.

The stem is hollow to provide a reservoir 23 which is threaded internally to receive the pressure screw 24 by which pressure may be applied to sealing material in the reservoir and force it past a check valve 25 and thence into the conduit 26 and distribution groove 27. In this manner sealing material will be forced into the area between the tapered surface 10 of the seat ring 7 and the tapered seating face 28 on the valve member 12. The seating faces may thus be sealed.

It is necessary to have a seal at the threaded opening 6 connecting the seat 7 in the partition or wall 5 because the differential between the high and the low pressures on the valve is across the partition and this connection. To provide a seal for this area a distribution groove 30 is formed in the periphery of the seat ring and at least one connection 31 extends from such groove radially thru the seat ring to the face thereof so as to receive sealing material from the groove 27 on the face 28 of the valve member 12.

In order that the sealing material may be automatically fed to the distribution grooves the valve member 12 is recessed from the base thereof to form a reservoir 32 which may be closed with the plate 33 screwed into the recess. A conduit 34 in the valve member leads from the top of the reservoir to the groove 27. A barrier or piston 35 in the form of a disc is disposed in the reservoir and arranged to move in response to pressure of the incoming sealing material so as to move down in the reservoir when the material is forced through the conduit 26, groove 27 and conduit 34 to fill the reservoir.

To feed the sealing material from the reservoir an opening 36 in the plate 32 admits line pressure from the flow passage 4 which will urge the barrier 35 upwardly.

The operation seems obvious from the description given and a complete seal is provided to prevent leakage through the valve.

Fig. 2 is identical with the construction just described except the reservoir in the valve member is omitted and a vent 40 leads from groove 27 to the high pressure flow passage to provide an escape for entrapped line fluid in response to downward movement of the pressure screw 24. As the entrapped line fluid is exhausted it is followed by sealing material thus insuring a pressure tight fit.

Broadly the invention comprehends a sealing system for globe valves where a complete seal against leakage through the valve is provided.

What is claimed is:

A lubricated globe valve comprising, a housing, a flow passage therethrough, a wall across said passage, a port therethrough, a seat ring disposed in said port, a valve member, a stem thereon to open and to close said member against said seat ring, means to provide a sealing material between said member and seat ring including a distribution groove on said member, a reservoir for a supply of sealing material in said valve member, a barrier movable therein responsive to line pressure when the valve is closed, means to inject sealing material through said stem, valve member, and base to said groove, a conduit connecting such reservoir to said groove so that lubricant injected when the valve is closed will by-pass said groove to said reservoir, an additional groove for sealing material between said seat ring and port, and a connection between said grooves when the valve is in closed position.

ALEXANDER S. VOLPIN.

REFERENCES CITED

The following references are of record in the file of this patent:

UNITED STATES PATENTS

| Number | Name | Date |
| --- | --- | --- |
| 1,689,799 | Nordstrom | Oct. 30, 1928 |
| 1,781,771 | Wilson | Nov. 18, 1930 |
| 2,304,491 | Allen | Dec. 8, 1942 |

FOREIGN PATENTS

| Number | Country | Date |
| --- | --- | --- |
| 781,948 | France | Mar. 4, 1935 |